(12) United States Patent
Kirkpatrick

(10) Patent No.: US 6,762,582 B2
(45) Date of Patent: *Jul. 13, 2004

(54) SYSTEM AND METHOD TO POWER AN ELECTRIC-POWERED DEVICE USING LIGHT ENERGY

(75) Inventor: Mark Kirkpatrick, Conyers, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/404,658

(22) Filed: Apr. 2, 2003

(65) Prior Publication Data
US 2003/0201750 A1 Oct. 30, 2003

Related U.S. Application Data

(63) Continuation of application No. 09/964,687, filed on Sep. 28, 2001, now Pat. No. 6,566,842.

(51) Int. Cl.[7] .................. H01M 10/44; H01M 10/46
(52) U.S. Cl. .................................................. 320/101
(58) Field of Search .................. 320/101, 103, 320/104, 124, 127, 135, 138; 136/292, 293; 323/906

(56) References Cited

U.S. PATENT DOCUMENTS

| | | |
|---|---|---|
| 5,156,568 A | 10/1992 | Ricci |
| 5,228,925 A | 7/1993 | Nath et al. |
| 5,489,002 A | 2/1996 | Streiff |
| 5,570,000 A | 10/1996 | Kowalski |
| 5,839,816 A | 11/1998 | Varga et al. |
| 5,897,156 A | 4/1999 | Hayard et al. |
| 5,905,356 A | 5/1999 | Wells |
| 6,084,379 A | 7/2000 | Buniatyan |
| 6,384,570 B2 | 5/2002 | Matsuyama |
| 6,566,842 B1 * | 5/2003 | Kirkpatrick |

* cited by examiner

Primary Examiner—Edward H. Tso
(74) Attorney, Agent, or Firm—Shaw Pittman LLP

(57) ABSTRACT

A system for and method of powering an electric-powered device associated with a vehicle is described that utilizes an adapter that receives current from an energy-converting cell and the vehicle battery. The adapter may forward current to the device from either one or a combination of the two current sources thereby charging or operating the device.

20 Claims, 8 Drawing Sheets

SYSTEM AND METHOD TO POWER AN ELECTRIC-POWERED DEVICE USING LIGHT ENERGY

This is a continuation of U.S. patent application Ser. No. 09/964,687, filed Sep. 28, 2001, now U.S. Pat. No. 6,566,842 which is herein incorporated by reference in its entirety.

BACKGROUND

1. Field of the Invention

The present invention is directed to a system for and method of powering a device using light energy. More particularly, the present invention is directed to a system for and method of charging or operating an electric-powered device in a vehicle using light energy.

2. Background of the Invention

Conventional vehicles typically are equipped with outlet power sockets, such as cigarette-lighter sockets or 12-volt power outlet sockets, which may be used to extend power to electric-powered devices. A suitable electrical connector may be extended between such a power-providing socket and the device to charge or operate the device.

Such devices used in or in association with a vehicle typically are portable and restricted in power intake such that the available 12 volt power source from a vehicle is sufficient to operate the devices for their intended purpose. Such exemplary devices include, but are not limited to, mobile telephones, televisions, stereos, compact disc players, video cassette players and recorders, air freshening devices, spotlights, electric grills and barbecues, refrigerators, and the like.

However, the constant use of the vehicle's battery to power such devices may result in eventual power loss in the vehicle battery. If the power in a vehicle battery is sufficiently drained, the battery may become too weak to operate the vehicle or may become "dead" altogether. Conventional vehicles do not have any means to minimize the power uptake from the vehicle battery when operating such devices.

Furthermore, conventional methods of powering such electric-powered devices typically do not allow for alternative sources of power to the device, such as, for example, light from the sun.

Therefore, an alternative power system and method, other than using a vehicle's battery power system and method as described above, are desirable.

Furthermore, it would be desirable for an alternative power system to be usable to supplement or supersede power available from the battery of a vehicle, to minimize power uptake from the vehicle battery.

It also would be desirable to use an alternative power system that uses power from the battery of a vehicle as a secondary source, thereby reducing the depletion of power from the battery.

Finally, it also would be desirable to use power from sources that do not harm the environment or result in high expense to an operator or owner of the vehicle. It further would be desirable to use a power source that does not deplete any of the earth's natural resources and, instead, is capable of using energy from an inexhaustible source, such as the sun.

SUMMARY OF THE INVENTION

The present invention is a system and method for powering an electric-powered device in or associated with a vehicle. The system comprises a light-energy transforming cell, such as a photovoltaic cell, that can convert light energy incident upon the cell into electric current. The cell is connectable to an electric-powered device via an adapter that has a standard 12-volt output socket. The cell may be supported by a support structure, such as a portable sunshade, that may be positioned inside of the vehicle, where the support structure can be protected from theft or damage from external factors. Alternatively, the cell may be supported by a support structure, such as a vehicle cover, that may be positioned outside of the vehicle, where the support structure may not be integral with the vehicle and is attachable to the vehicle through connecting means.

Exemplary embodiments of other support structures, either inside of the vehicle or outside of the vehicle, used for supporting the cells, are possible, and are described below. During use, light from an ambient source that reaches the cell induces the cell to convert light energy into electric current, which is carried by an electrical connector to the adapter, which is connected to the electric-powered device through suitable electrical connectors, thereby powering the device.

The present invention addresses and overcomes the drawbacks of having to rely solely on the battery of a vehicle to provide power to an electric-powered device used in or in connection to a vehicle.

Thus, the present invention provides numerous advantages, including providing power to an electric-powered device at virtually any location with a sufficient light source.

It is therefore an object of the present invention to provide a system for using light energy to power an electric-powered device.

It is another object of the present invention to provide a system that is easy to install and operate, and economical to use.

It is another object of the present invention to provide a system that may be used anywhere there is a sufficient light source to cause the energy transforming cells to produce electric current.

It is yet another object of the present invention to provide a method that is easy to follow and requires minimal steps to implement.

It is a further advantage of the present system to provide a method for using light energy to power an electric-powered device.

It is another object of the present invention to use solar energy as a light source to power an electric-powered device.

These and other objects of the present invention will become apparent upon a reading of the following detailed description in conjunction with the accompanying drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
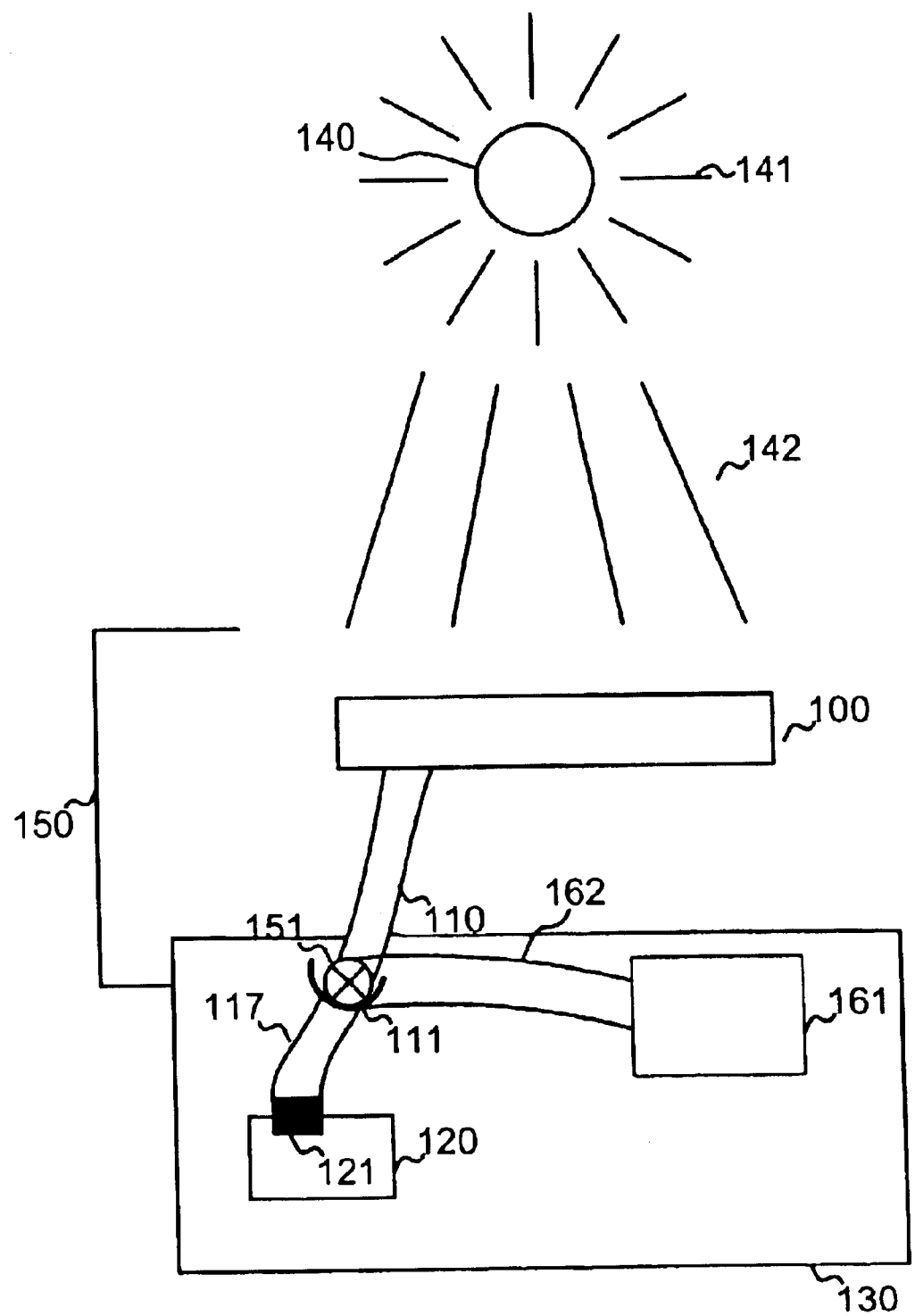
FIG. 1 is a schematic diagram of an exemplary system for powering an electric-powered device.

Throughout this disclosure, the term "power" is used to generally describe providing sufficient energy to a device so that the device can operate, or is put into a better state to operate, for its intended purpose. The term "power" includes, for example, but is not limited to, charging a device and operating a device. Included in the definition of "power" is the situation in which a device is not given sufficient power to operate for its intended purpose, but the device is put into a better energy state. A non-limiting example of this scenario is when a flood light is not powered enough to be fully bright but is given even a minor level of power that enables it to provide some, albeit, weak level, light. Thus, any transfer of any level of power, even at a weakened level, to an electric-powered device is within the scope of the term "power" as used throughout this disclosure.

Throughout this disclosure, the term "vehicle" is used to generally describe any machine, typically used for transport, that obtains substantial power for transport through an electric power source, such as, for example, a battery. Similarly, an electric-powered device is defined as a device that obtains substantial power for operation through an electric power source.

As used herein, "substantial power" in reference to the electric power source means that without the electric power source, the vehicle or device would not be operable for its intended purpose.

Typical vehicles may include, but are not limited to having, a designated space for an operator, such as a driver or conductor. Such vehicles may include, but are not limited to, automobiles, trucks, buses, tractors, dune buggies, motorcycles, scooters, ships, boats, jet skis, airplanes, helicopters, trains, trolleys, gondolas, and the like. Other machines included in the definition of "vehicle", as used herein to describe the invention of the present application, and used in conjunction with the present invention, typically may not have a designated space for an operator. Such typical vehicles without a designated space for an operator include, but are not limited to: lawn mowers; farm equipment; any remote-controlled machines, such as for example, cars, planes, helicopters, boats, and motorcycles; and the like. The vehicle, as described above, may be gasoline-powered, electric-powered, solar-powered, a hybrid, or powered by other means.

The present invention provides a system and method for powering, such as, for example, charging or operating, an electric-powered device given a sufficient light source. Using a light source, such as, for example, but not limited to, light from the sun, the system and method of the present invention promotes the charge or operation of an electric-powered device. The device may be operated while the vehicle is stationary, such as, for example, in a parking lot at the work place of its operator, or while the vehicle is parked at a beach park. The device also may be charged or operated while the vehicle is in motion. The operator of a vehicle may allow the device to be charged or operated while the vehicle is parked anywhere there is sufficient light to generate power via an energy converting means, such as, for example, a cell.

As used throughout this disclosure, a "cell", may be, for example, a device, an apparatus, a contraption, a gadget, or the like that is capable of receiving light from any light source and converting energy received from the light source into electric current, either AC or DC. As just one non-limiting example, photovoltaic cells may be used to transform energy from a light source into electric current. In a non-limiting exemplary embodiment, photovoltaic cells may be used to collect power from available light, such as sunlight, and output current, created from the transformation of light into current, to charge or operate a device.

Reference will now be made in detail to the present exemplary embodiments of the invention, examples of which are illustrated in the accompanying drawings. Wherever possible, the same reference numbers will be used throughout the drawings to refer to the same or like parts.

In the illustrated embodiment, as depicted in FIG. 1, a system 150 is shown for powering an electric-powered device 161, in or associated with a vehicle 130, via an energy-converting means, such as, for example, a cell 100. The cell 100, as defined above, may be, for example, any device that can transform light energy 142 from a light source 140 that emits a light 141 into electrical current, which is then used to power the device 161. One such cell 100 may be, for example, a photovoltaic cell, such as silicon photovoltaic cells, gallium arsenide photovoltaic cells, amorphous silicon photovoltaic cells, cadmium sulfide photovoltaic cells, or other semiconductor photovoltaic cells. However, cell 100 is not limited to photovoltaic cells and may be any type of generator that can transform light energy into DC or AC electric power.

The light source 140 may be any source that emits any natural or artificial light energy, including, for example, but not limited to, the sun, fluorescent light sources, incandescent light sources, flames, reflections, lasers, and the like.

The light 141 emitted by the light source 140 may generally light the surrounding of the light source 140, such as, for example, a conventional light bulb. Alternatively, the light source 140 may be concentrated to direct the light 141 in a given light path, such as by flood lights or lasers.

The light energy 142 detected by the cell 100 may have been generated as a result of light 141 from a single light source 140 or multiple light sources of the same or different types, as described above. The light energy may be continuous, such as from a continuous light 141 from a light source 140, or it may be discontinuous, as from a flickering or flashing light 141 from a flickering or flashing light source 140.

The energy-converting cell 100 is in communication with a current-controlling means, such as an adapter 151, typically through one or more current carrying means or devices, such as an electrical connector 110. The adapter 151 allows current received from the cell 100 to be routed to one or more electric-powered devices 161 through suitable connectors 162. Connectors 110, 117, and 162 may be, for example, but are not limited to, electrical wires or cables.

The adapter 151 also may be positioned in a receiving socket 111 in the vehicle 130. The receiving socket is capable of transferring current from the battery 120 of the vehicle 130 to the adapter 151, thereby providing an additional source of current for the device 161.

The connection between the connector 117 and the battery 120 may be a contact area 121 that allows the connector 117 to electrically connect with interior components of the battery 120. This contact area 121 may be directly on the surface of the battery 120, such as, for example, posts on a battery. However, the contact area 121 may also be interior of the battery 120.

Figure 2:
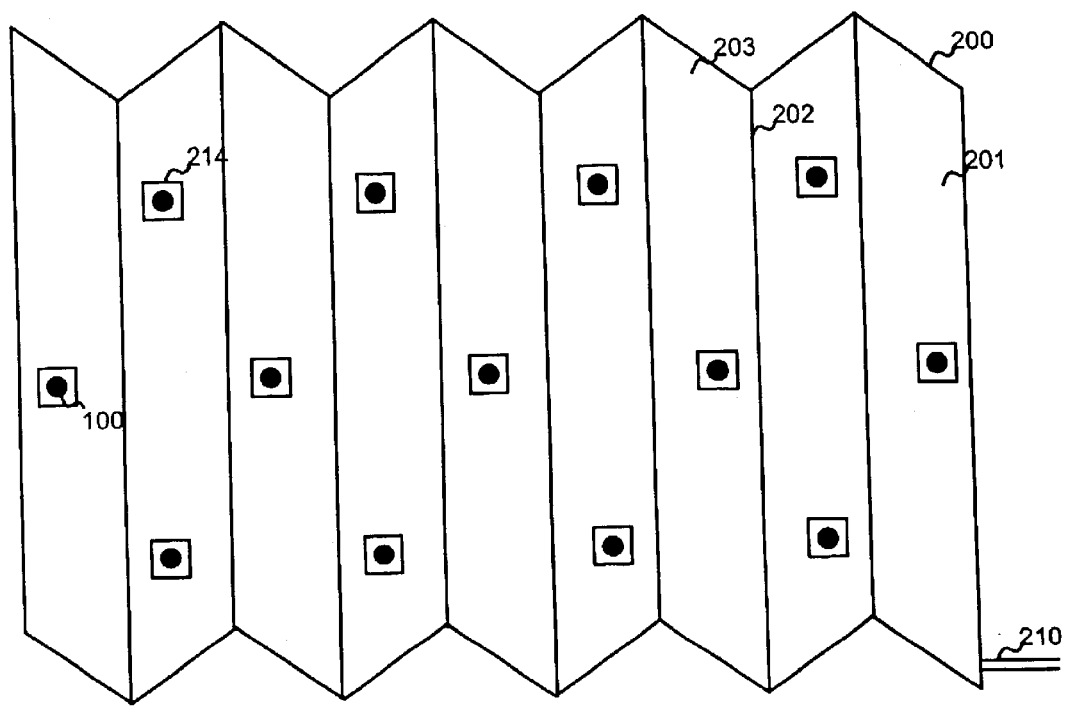
FIG. 2 is a light-facing side of an exemplary embodiment of the invention in the form of a conventional vehicle sunshade.

The system 150 may be implemented on a number of cell support means, such as, for example, portable platforms. One exemplary embodiment of a platform placed inside of a vehicle is a conventional sunshade, typically placed inside the front windshield or other window of a vehicle to block out the radiation effects of the sun, maintain a cooler interior of the vehicle, and preserve the interior materials from fading and cracking. FIG. 2 depicts such a sunshade 200. A conventional sunshade 200 typically has a number of creases 202 that enable the sunshade to easily fold into a substantially flat configuration for ease of handling and storing while not in use. The sunshade 200 may have a number of panels 203 separated by the creases 202. The panels 203 may be of substantially equal dimensions and are folded on top of each other when the sunshade is folded, in an accordion-like fashion.

In an exemplary embodiment of the invention, a sunshade 200 is depicted having one or more energy transforming cells 100 that are positioned so that their light-receiving sides are adjacent a designated front side 201 of the sunshade 200. Each cell 100 may be covered by a protective sheet 214, which will be described in more detail below.

Figure 3:
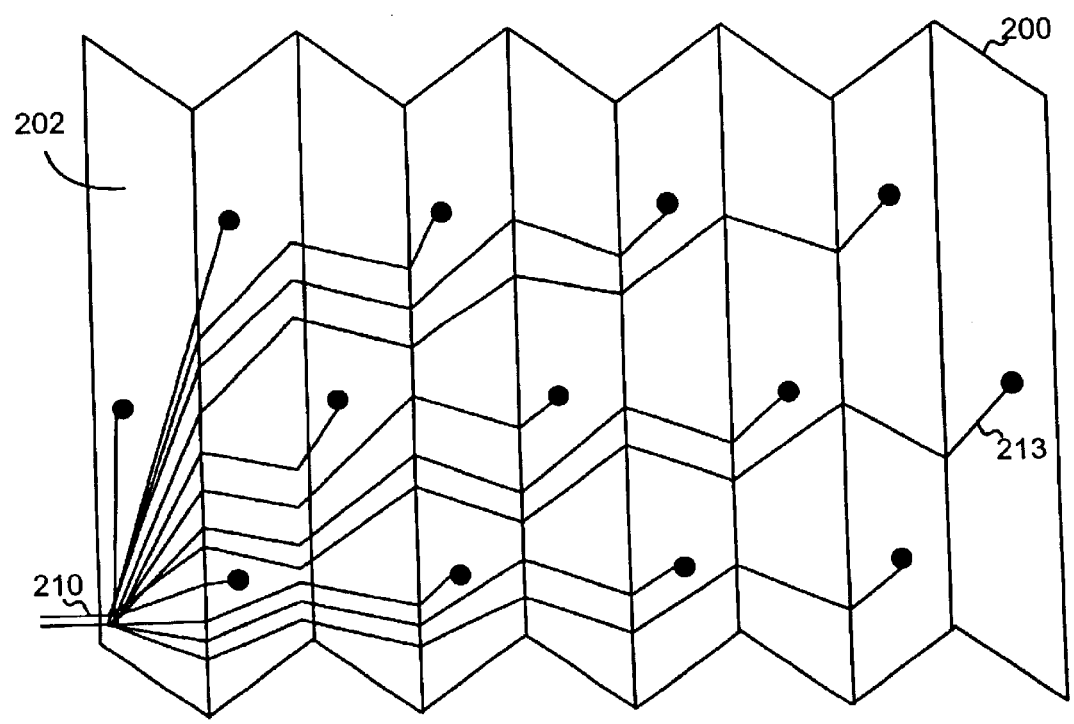
FIG. 3 is the opposite side of the exemplary embodiment depicted in FIG. 2.

The sunshade 200 also may have a back side 202, as shown in FIG. 3, which is opposite the front side 201. The back side 202 may support one or more electrical connectors 213, which may be, for example, electrical connecting wires or cables, that lead into an output connector 210, which may be the same as cable 110, or electrically connected to cable 110. Output connector 210 may carry a sum current to the adapter 151 created by all the currents generated by each cell 100 and delivered to the output connector 210 via individual electrical connectors 213. The output connector 210 may be attached to a convenient corner or side of the sunshade 200. All connectors 110, 117, 210, 213 may be attached to adjacent structures through suitable attaching means, such as, for example, glue, epoxy, tape, fasteners, snaps, pins, or the like. For example, wires 213 may be attached to the back 202 of the sunshade 200 through a suitable attaching means, such as epoxy. Care must be taken to ensure that the attaching means does not interfere with the function of the connectors.

Figure 4:
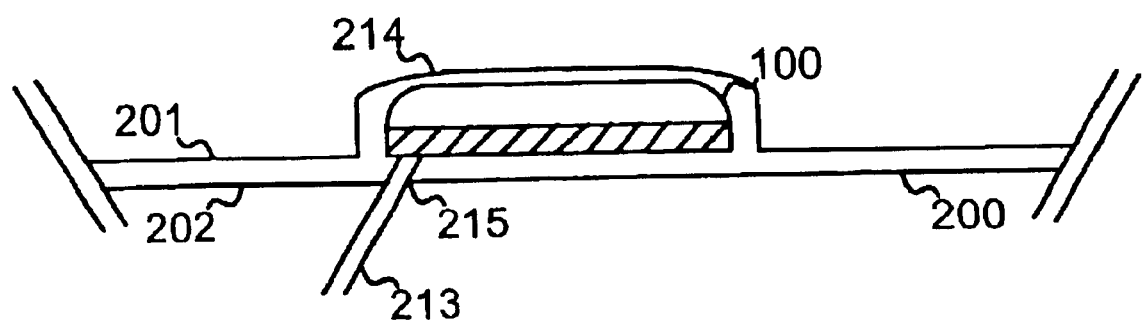
FIG. 4 is an exemplary embodiment of a cell chamber wherein a light-transforming cell 100 is housed in accordance with one embodiment of this invention.

The cell 100 may be attached to the front side 201 of the sunshade 200, as depicted in FIG. 4. The cell 100 typically attaches to the front side 201 by suitable attaching means, such as those described above, such as for attaching the wires 213 to the back 202 of the sunshade 200. Alternatively, the cell 100 may be supported by the sunshade 200 by being partially inserted into the body of the sunshade 200 by a supporting opening, such as a hole (not shown). In the alternative embodiment using a supporting hole, a friction fit may be sufficient to promote support of the cell 100 onto the sunshade 200. Furthermore, care must be taken to ensure that the attaching means for attaching the cell 100 to the sunshade 200 does not adversely affect the function or integrity of the cell 100 or sunshade 200.

An opening, such as a hole 215 in the sunshade 200, typically large enough to pass the wire 213 therethrough, passes from the cell 100 on the front side 201 to the back side 202 of the sunshade 200. A protective cover 214, such as a sheet, may be used to protect the cell 100 from external elements that may cause damage to the cell 100. For example, the protective sheet 214 may protect against damage from dust, debris, moisture, liquids, and the like, that may cause damage to the cell 100. Furthermore, the protective sheet 214 further promotes the stable positioning of the cell 100 on the surface of the sunshade 200. The protective sheet 214 is translucent to let light therethrough to the cell 100, and is preferably relatively sturdy to protect the cell 100 from external contaminants, as listed above. Exemplary protective sheets may be composed of, for example, a clear glass or plastic, preferably a material that is transparent in the near-infrared, visible, and near-UV regions of the spectrum. The edges of the protective sheet 214 may be secured to the sunshade 200 through conventional securing means known in the art, such as, for example, epoxies or other adherents, tape, staple, clip, fastener, or the like.

The exemplary embodiment of this invention in the form of a sunshade 200 described above and depicted in FIGS. 2–4 is only one example of the implementation of the present invention and is not intended to be limiting of the invention. The conventional sunshade 200 is a suitable support structure for the device of the present invention because it is universally available and easy to position within a vehicle to be exposed to maximum sunlight. However, the present invention may be used with any vehicle, as defined above, and attached to any suitable material associated with the vehicle that is capable of supporting the invention and wherein the cells 100 are exposed to light energy.

Figure 5A:
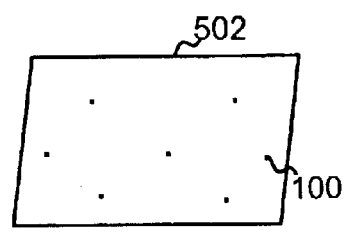
FIGS. 5a, 5b, and 5c show a side perspective view of exemplary embodiments of this invention.
Figure 5B:
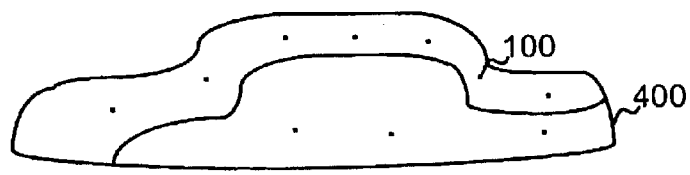
Figure 5C:
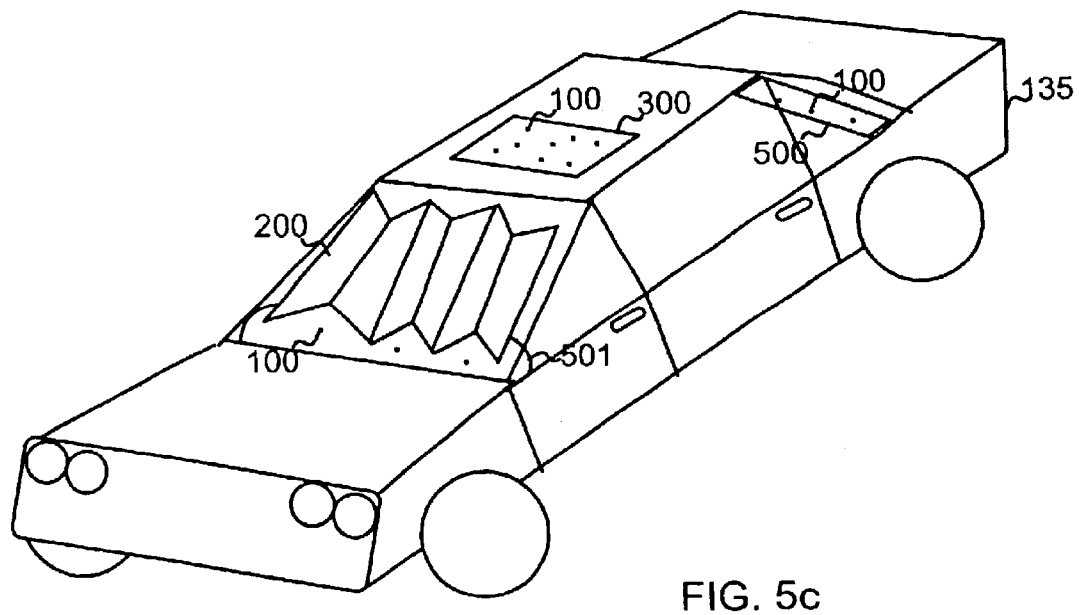

Exemplary embodiments of the system of the invention may be incorporated into: a permanently-fixed device outside of the vehicle, as shown in FIG. 5a and described in more detail below; a portable device outside of the vehicle, as shown in FIG. 5b and described in more detail below; or a permanent or portable device inside of the vehicle, as shown in FIG. 5c and described in more detail below.

The exemplary embodiment described above is used in conjunction with a conventional, lightweight, and portable device, placed inside of a vehicle, such as a sunshade 200, to promote ease in understanding the invention as a power system 150. However, the power system 150 also may be used in conjunction with other cell support means, such as, for example, conventional, lightweight, and portable devices, placed on the outside of a vehicle, such as a conventional vehicle cover 400, such as for an automobile 135, as depicted in FIG. 5b. An advantage of incorporating the power system 150 of the invention with a support structure that is outside of a vehicle, such as a vehicle cover 400, is that there is a greater surface area to enable larger numbers of cells 100 to be supported thereon. Furthermore, the cover 400 also can keep the entire automobile 135 cool by protecting the vehicle's exterior finish and interior components.

The sunshade 200, positioned inside of a vehicle, and the cover 400, positioned outside of a vehicle, are exemplary embodiments of the system 150 of the present invention being incorporated into temporary devices that are not typically permanently part of a vehicle. Such devices are typically portable, lightweight and relatively inexpensive. Thus, an owner of a vehicle may be able to purchase such temporary devices having a system 150 incorporated therein from stores that typically sell such after-market devices.

There may be persons who would want to have the system 150 of the present invention already permanently incorporated into a vehicle, also considered "inside" of the vehicle as defined above, electing not to buy such a system through the after-market. Thus, alternatively, the power system 150 of the invention may be made part of a cell support means that is a relatively fixed component of a vehicle, such as the automobile 135 depicted in FIG. 5c. Examples of such relatively fixed components include, but are not limited to: a conventional sun/moon roof (and/or sun/moon roof sliding shield, which is typically positioned between the glass and an operator) 300; a back shelf 500 just inside a back windshield of a vehicle 135; a front dashboard area 501 just inside the front windshield; or along any sides and typically out of driver or passenger eyesight of glass panes of windshield, side, or quarter windows, within a holding structure of clear signal or other lights of the vehicle; or the like. An advantage of a power system 150 built into relatively fixed components of a vehicle is that any wiring used for the system will be hidden from view and thereby less prone to damage or theft. Such power systems 150 pre-integrated into fixed components of a vehicle may be optional or standard equipment on new vehicles.

In a further embodiment, as shown in FIG. 5a, the system 150 of the present invention may be incorporated into a permanently-fixed device 502 outside of the vehicle and not integral with the vehicle. For example, it may be desirable to have the system 150 be part of a roof or wall of a building structure that is in proximity to a vehicle, but not in, on, or part of the vehicle. Thus, whenever the vehicle is parked at, in, or near such permanently-fixed devices 502, an operator need only connect a suitable connector, such as cable 210 from the device 502 to the vehicle 135. Garage roofs and doors are suitable examples of such permanently-fixed devices 502.

As described above, the adapter 151 is connected between the cell 100 and the device 161 through suitable electrical connectors 110 and 162, respectively. The adapter 151 thus enables current generated by the cell 100 to travel to and power the device 161.

Figure 6A:
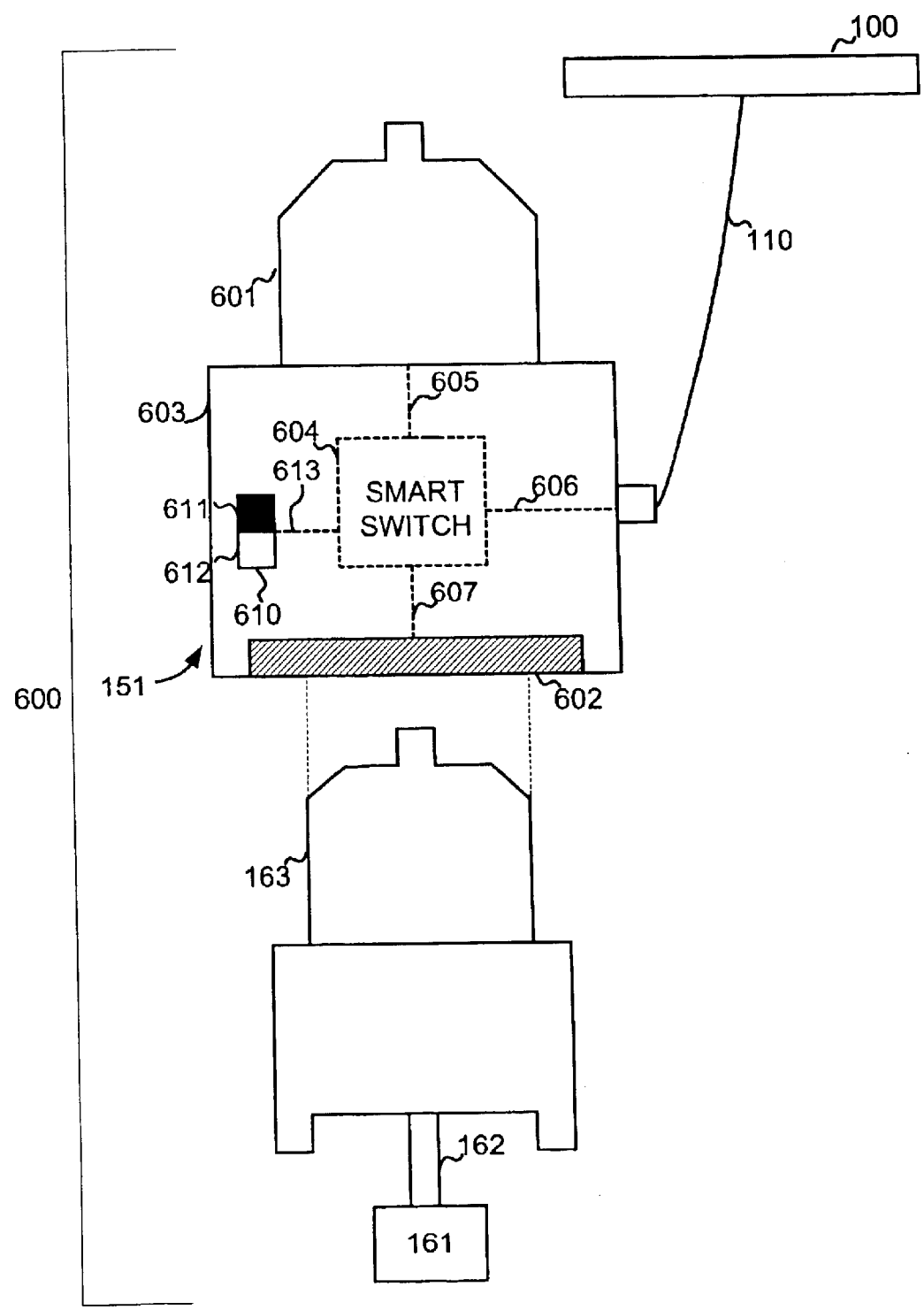
FIG. 6a is a side plan view of a power system for an electric-powered device according to an exemplary embodiment of the invention.

FIG. 6a shows a system 600 that includes an adapter 151 in connection with a cell 100, according to the present invention, in connection with a conventional electric-powered device 161. The adapter 151 may have an output means, such as an adapter socket 602, that enables a complementing end 163 of a connector 162 leading to a device 161 to connect thereto. Such a complementing end 163 of the connector 162 leading to a device 161 may be, for example, but not limited to, a conventional cigarette lighter male plug. Many devices 161 that are intended to be used in or associated with a vehicle 130 typically have plugs that are shaped to fit into conventional cigarette lighter sockets. Thus, it would be preferable to make the adapter socket 602 shaped to receive such cigarette lighter male plugs.

During operation of the system of the present invention, incident light that is detected by a cell 100 is converted into electric current that flows through connector 110 to adapter 151. Such generated current is further lead into connector 162 through suitable connection, such as through the socket 602 to plug 163 combination, between the adapter 151 and a connector 162. The current thus flows through the connector 162 into the device, powering the device, either for charging or operation.

However, the current generated by the one or more cells 100 may be insufficient to charge the device 161 at a rate that is satisfactory with a user, or, insufficient to operate the device 161 for its intended purpose. In both examples, it would be necessary to supplement the charge provided to the device 161 with power from the battery 120 of the vehicle 130. Thus, the adapter 151 also may be equipped with a connection end 601, such as a conventional cigarette lighter male plug, that connects into a socket 111 of the vehicle 130. The socket 111 of the vehicle may be, for example, a conventional cigarette lighter socket. Thus, the adapter 151 may be electrically connected to the battery 120.

When the adapter 151 is in electrical connection with the battery 120, the adapter 151 may draw in power from two sources, the cell 100 and/or the battery 120. In such a configuration, the device 161 can be supplied from either one of the two sources of power, or a combination of the two. Furthermore, it would be advantageous for a user to control the level of power directed into the device 161 such that the consumption level of power generated by the cell 100 is maximized and the consumption level of power generated by the battery 120 is minimized.

In the exemplary embodiment shown in FIG. 6a, the adapter 151 includes a power selector switch 610 that allows a user to switch between a charge mode, at position 611, and an operate mode at position 612. The selector switch 610 may be positioned on the body 603 of the adapter 151. When the selector switch 610 is in the charge position 611, an electrical connector 613 directs a smart switch 604, described in more detail below, to cut off any electrical connection to the battery 120 when any current from the cell 100 is detected. Thus, when the switch 610 is in position 611, the smart switch 604 chooses to forward current to the device 161 either from the battery 120 or the cell 100, not a combination. Furthermore, when the smart switch 604 detects any current from the cell 100, such a current flow will supercede any current from the battery 120. Current generated by the cell 100 travels through the connector 110 until it reaches the body 603 of the adapter 151, at which point the current travels through connector 606 to smart switch 604. The current then travels through electrical connector 607 inside the adapter 151 to socket 602, wherein the plug 163 carries the current to the device 161 through connector 162.

The charge setting at position 611 is advantageous when a device 161 is being charged over time, such as when a cellular telephone is being charged during a car trip. The cellular telephone is charged through the conventional way by attaining power from the battery 120 of the vehicle 130 until the cell 100 detects enough light to generate current, at which point the smart switch 604 cuts the battery 120 connection to the device 161. Only current generated from the cell 100 is forwarded to the device 161. Such charging of a device 161 may be at a non-constant rate or at a slower pace than when the device is charged by the battery 120. However, it ensures that minimal tapping of power from the battery 120 is maintained. Thus, for charging purposes, position 611 is advantageous to "trickle charge" a device 161 over time without tapping into the battery 120 power.

However, because power generated by one or more cells 100 may not be sufficiently high enough or constant enough to operate a device 100, the charge option at position 611 typically is more useful when the device is being charged, rather than operated. For example, when clouds block the view of the sun and the cell 100 does not produce as much current as when the sunrays contact the cell 100, the level of current will fluctuate, and thus the level of power produced will fluctuate. Although fluctuating current and power is not practical for operating a device 161, it is usable to charge the device 161. If there are a plurality of cells 100 that produce enough charge to operate a device 161, then the switch 610 may be kept in the 611 position.

Alternatively, the switch 610 may be moved to position 612, which is the operate position. When the adapter 151 is in the operate position 612, the smart switch 604 is signaled through the connector 613 to draw in enough current from both power sources 100, 120 to produce 12 volts of power for the device 161, typically enough to operate devices plugged in a vehicle. The smart switch 604 is programmed to first draw all current flowing into it through connector 606 and generated by the one or more cells 100. If the sum current flowing into the smart switch 604 through connector 606 is insufficient to produce 12 volts of power for the device 161, the smart switch will automatically draw in enough current from the battery 120 through connector 605 to make up any deficiency. In other words, the smart switch 604 will take the current flowing into it from the cells 100 and direct such current to the device 161, but making up any deficiency in current by drawing in the deficient amount of current from the battery 120.

Figure 6B:
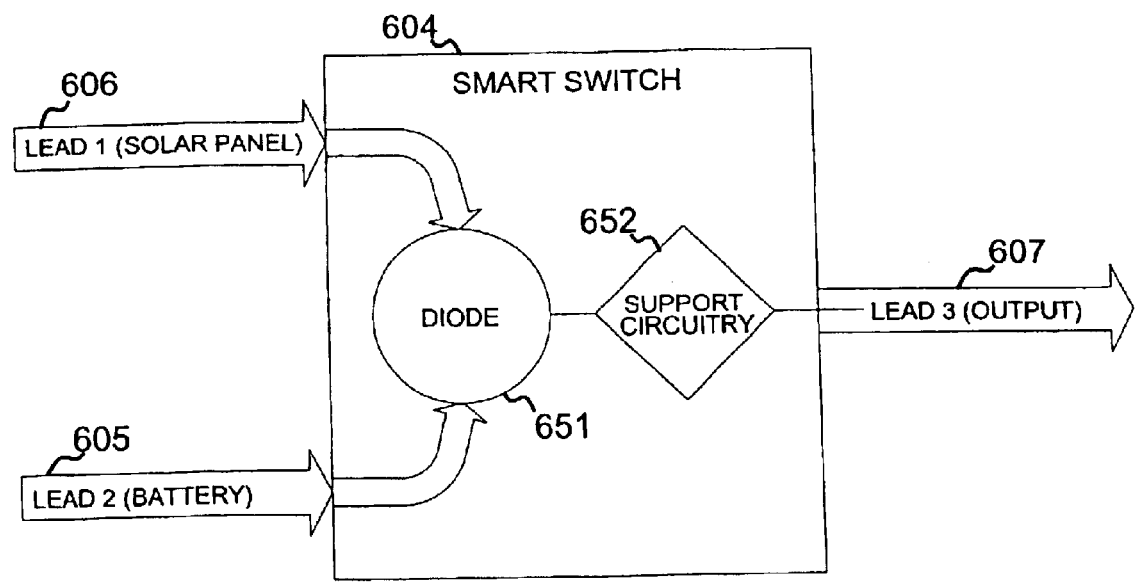
FIG. 6b is a schematic diagram of a smart switch that regulates current flow, according to an exemplary embodiment of the invention.

As a non-limiting example, if the cells 100 generate only enough current to produce 11 volts of power, the smart switch 604 will automatically draw in a sufficient amount of current from the battery 120 to produce a sum total of 12 volts. A non-limiting example of a smart switch 604 that may be used with this invention is shown in FIG. 6b. The smart switch 604 acts as a regulator of current flow coming from multiple current sources, for example, a solar source entering via a first lead 606, and a battery source entering via a second lead 605. The incoming currents are regulated by, for example, a diode 651 that can be adjusted to receive current from a primary source lead 606 and a secondary source lead 605 to produce a constant voltage output through an output third lead 607 directed to a device 161. Support circuitry 652 can further regulate the output voltage to a designated level, such as, for example, 12 volts. The smart switch 604 may either be a set of components that together can regulate current and voltage as described above, or a single chip that has all necessary components pre-fabricated in place for this purpose. Although FIG. 6b shows an exemplary smart switch design, other types of smart switches also are possible.

When the adapter 151 is set in the device operate mode, i.e., when switch 610 is set to position 612, the device 161 will receive a sufficiently constant source of current from the adapter 151 through plug 163 and connector 162 to enable the device to operate substantially as intended. Furthermore, a beneficial effect of using the adapter 151 in conjunction with the device 161 is that the draw of power from the battery 120 of the vehicle 130 is minimized. Thus, the life of the battery 120 is extended without comprising the function of the device 161.

Figure 7:
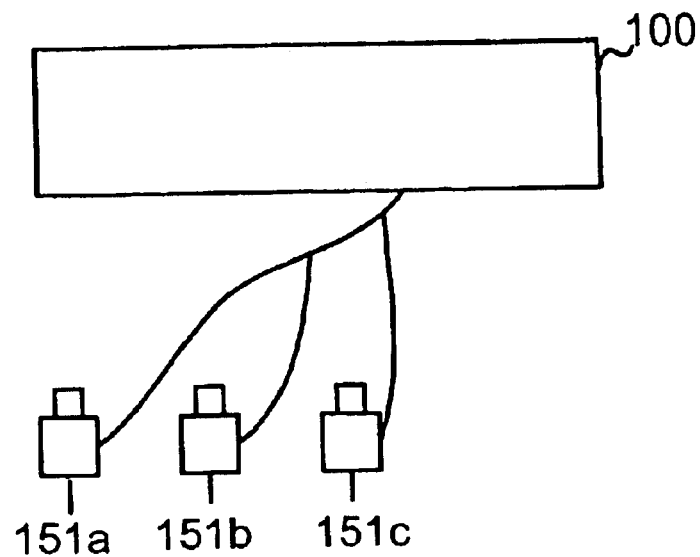
FIG. 7 is a schematic diagram of a power system for an electric-powered device according to another exemplary embodiment of the invention.
Figure 8:
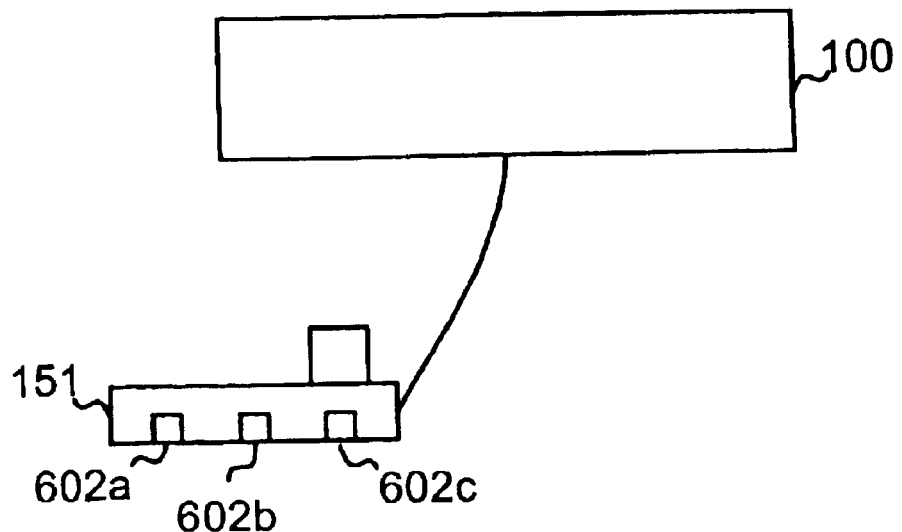
FIG. 8 is a schematic diagram of a power system for an electric-powered device according to yet another exemplary embodiment of the invention.

Although the above described exemplary embodiments of the present invention have been depicted in the figures with only one adapter 151 or one socket 602, the system of the invention is not limited to such embodiments. As a non-limiting example, and as depicted in FIG. 7, a system according to an embodiment of this invention may have two or more adapters, such as adapters 151a, 151b, 151c, connectable to one or more cells 100. In such an embodiment, a user will be able to charge and/or operate multiple devices, each device connected to its own adapter. A vehicle should have enough sockets to be able to receive each of the adapters 151a–151c. Many conventional vehicles, such as minivans and sports utility vehicles, are equipped with multiple sockets to operate multiple devices. With the system of the present invention, such devices would not have to derive their entire power source from the battery in the vehicle.

In another exemplary embodiment, a single adapter 151 may have two or more sockets, such as sockets 602a, 602b, and 602c. When a single adapter 151 has multiple sockets 602a–602c, only one vehicle socket 111 is needed, if one is to be used at all. This is beneficial when a vehicle has a limited number of sockets 111 but more than one device 161 that needs a power boost from an alternative power source other than the battery 120.

In another exemplary embodiment of the present invention, a method is disclosed for powering an electric-powered device 161 using light energy 142. Referring to FIG. 1, an energy-transforming cell 100, that is supported on a supporting structure positioned either inside or outside of the vehicle 130, and that can convert light energy 142 received from a light source 140 into electrical current, is exposed to a such a light source 140. Upon exposure to the light energy 142, the cell 100 is induced to create electric current. The electric current is provided to adapter 151 using one or more connectors, such as connectors 110 and 117, thereby powering the device 161. The device 161 also may draw power from the battery 120 through the adapter 151 by an electrical connection between the battery and the adapter. The adapter 151 may be set to forward to the device 161 only current generated by the cell 100 when any current is generated by the cell 100 and detected by the smart switch 604, thereby blocking any current from the battery to the device 161. Alternatively, the adapter 151 may be set to forward to the device 161 any current generated by the cell 100, and additionally draw current from the battery 120 to produce a sum current that culminated in a pre-determined voltage, such as 12 volts, for the device 161. Either method may be used to charge the device 161. The latter method may be used to operate the device 161.

It will be apparent to those skilled in the art that various modifications and variations can be made in the systems and methods of the present invention and in construction of this system without departing form the scope and spirit of the invention. As an example, the support material on which one or more converter cells 100 are connected thereto may be electrically positioned to trap light energy upon turning off of a vehicle, for example, by vertically moving panels that are positioned interior of the side glass windows and are vertically movable to block sunlight, hide any valuables inside the vehicle from outside view, and as described by this invention, trap light energy to charge the battery. Furthermore, the number of cells 100 on a particular supporting material or device, such as the exemplary embodiment depicting a sunshade 200, may be varied, with a greater number of cells 100 typically producing a quicker power rate for a device 161, but also increasing the cost and components of the device on which the system 150 resides. Thus, the number of cells 100 that should be used on a particular support structure may be determined by weighing the desire for higher power rates versus costs associated with increased number of cells 100. If a vehicle is typically parked or driven in places where there is lower available light to produce light energy, a support structure for the cells 100 having a higher number of cells 100 is more practical.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for powering an electric-powered device, the system comprising:
    an energy-converting cell that converts light energy received from a light source into electrical current;
    an adapter in communication with the cell and a current source, wherein the adapter receives current from both the cell and the current source; and
    an outlet on the adapter that is connectable to an electric-powered device;
    wherein the adapter can draw current from either the battery or the current source or a combination thereof and forward any cumulative current as power to the device.

2. The system of claim 1, wherein when the adapter detects any current coming from the cell, the adapter provides the current to the device and shuts off current from the current source.

3. The system of claim 1, wherein the adapter receives current from the cell and determines a power output for the current, thereby optionally drawing additional current from the current source to supplement the current from the cell, to generate a pre-determined power level for the device.

4. The system of claim 3, wherein the pre-determined power level is 12 volts.

5. The system of claim 1, wherein the current source includes a battery.

6. The system of claim 1, wherein the cell includes a photovoltaic cell.

7. The system of claim 6, wherein the photovoltaic cell is covered by a protective translucent cover.

8. The system of claim 6, wherein the photovoltaic cell comprises a plurality of photovoltaic cells.

9. A system for powering an electric-powered device, the system comprising:
    means for converting light energy received from a light source into electrical current;
    means for controlling current flow, the current-controlling means in communication with the energy-converting means and a current providing means that provides current, wherein the current-controlling means receives current from both the energy-converting means and the current providing means; and
    means for outputting current, the output means being part of the current-controlling means and connectable to an electric-powered device;
    wherein the current-controlling means draws current from either the energy-converting means or the current providing means or a combination thereof and forwards any cumulative current as power to the device.

10. The system of claim 9, wherein when the current-controlling means detects any current coming from the energy-converting means, the current-controlling means provides the current to the device and shuts off current from the current providing means.

11. The system of claim 9, wherein the current-controlling means receives current from the energy-converting means and determines a power output for the current, thereby optionally drawing additional current from the current providing means to supplement the current from the energy-converting means, to generate a pre-determined power level for the device.

12. The system of claim 11, wherein the pre-determined power level is 12 volts.

13. The system of claim 9, wherein the current providing means includes a battery.

14. The system of claim 9, wherein the energy-converting means includes a photovoltaic cell.

15. The system of claim 9, wherein the energy-converting means is protected by a means for protecting.

16. The system of claim 9, wherein the energy-converting means comprises a plurality of energy-converting means.

17. A method for powering an electric-powered device, the method comprising:
    exposing an energy-converting cell to a light source, the cell converting light energy received from the light source into electrical current;
    electrically connecting an adapter with the cell and a current source, wherein the adapter receives current from both the cell and the current source, the adapter having an outlet that is connectable to the device, wherein the adapter can draw current from either the cell or the current source or a combination thereof; and
    communicating the electrical current received by the adapter with the device, thereby powering the device.

18. The method of claim 17, wherein the current source includes a battery.

19. The method of claim 17, wherein the cell includes a photovoltaic cell.

20. The method of claim 19, wherein the photovoltaic cell comprises a plurality of photovoltaic cells.

* * * * *